March 16, 1943.   V. R. O'BRIEN   2,314,157
BREAD AND WORK BOARD AND SINK CONSTRUCTION
Filed Feb. 14, 1941   2 Sheets-Sheet 1

Inventor
VINCENT R. O'BRIEN
By Howard L. Freele
Attorney

March 16, 1943.  V. R. O'BRIEN  2,314,157
BREAD AND WORK BOARD AND SINK CONSTRUCTION
Filed Feb. 14, 1941   2 Sheets-Sheet 2

Inventor
VINCENT R. O'BRIEN
By Howard Lüche
Attorney

Patented Mar. 16, 1943

2,314,157

UNITED STATES PATENT OFFICE 2,314,157

BREAD AND WORK BOARD AND SINK CONSTRUCTION

Vincent R. O'Brien, St. Paul, Minn.

Application February 14, 1941, Serial No. 378,888

3 Claims. (Cl. 4—187)

My invention relates to an improvement in a sink and cupboard board. It is the object of my invention to provide a bread or work board which may be used in conjunction with a sink or cupboard. My bread or work board is used in connection with a sink in such a way that the board can be made as an accessory to a sink.

My bread or work board is so designed and so constructed that it can be dropped from sight below the face of a sink and when needed may be picked up out of the slot and laid across the top of the sink. In this manner my bread board lies very firmly on the face of the sink. By having the board lie on the face of the sink pressure may be applied to the face of the board without causing it to give in any way, or causing breakage of the same.

Most bread boards of the shelf type used today, project out from a cupboard having only one means of security and that is by having the inner end of the board remain in the cupboard with no support beneath the board proper. In most cases the bread board is also placed where it may be easly pulled out from the cupboard; however, in such cases the board can only be pulled partially out, thus reducing the working surface of the board. In such case, too, however, the board is still not very firm and if too great an amount of pressure is applied to the face of the same, it often causes the bread board to break. On the other hand, in many cases the bread board is pulled out too far and the end of the board comes out of the slot and the board falls on the floor. With the use of my bread and work board, it is impossible to drop the board on the floor while it is in use because of the fact that it rests firmly on the face of the sink or adjacent cabinet. As can readily be seen, the board lies solid over the drain board of the sink.

It is a feature of my invention to provide a bread or work board which is fastened to the sink and which can be used in cases where a cabinet is built around the sink. Many people purchase a sink basin and have a cabinet maker build a cabinet around the sink basin. In such cases, my invention consists in having the bread or work board constructed in the sink basin. The board may be so constructed as to be secured to the sink basin at one side and when the cabinet is built around the sink, the board can be made to lie on the face of the cupboard. In this way provision is made for a bread board right in the sink proper and at the same time can be used very easily and can be dropped out of sight below the face of the sink.

It is an object of my invention to provide a bread board which has a rubber covering on one of its sides. The rubber covering is used where the bread board can be taken off and turned around, thus using both sides of the board; however, as the case may be, some sinks that are made with two drain boards can have a bread board on one side and on the other side have a board that is made of rubber which may be used as a drain board.

It is a feature of my invention to provide a bread board which is so constructed that it is an accessory in adding beauty to a sink. Now days many things are chromium-plated and in the case of my bread board, the handle and one end of the board which projects above the sink face can be chromium-plated, making the same very attractive.

It is a feature of my invention to provide a pivot means on my bread board by which the board may be lifted in a slot in or adjacent the sink and laid on the surface or drain board of the sink. This is a very simple construction and is made in such a way that it is almost impossible to break any of the working parts. This feature adds long life to my bread or work board.

It is a feature of my invention to provide shoulders on the bread or work board which hold the board to the face of the sink while the remainder of the board is dropped from sight. By means of a handle, the board is picked up and drawn from the slot and pivoted to lie on the surface of the sink by the pivot means already described.

Still another object of my invention resides in providing a rubber drain board which is used in conjunction with the sink drain board. The rubber drain board is so constructed that it can be placed upon the surface of the sink drain board. By using the rubber drain board, dishes and glassware may be placed upon the rubber face with less danger of chipping or breaking. Therefore, the danger of slippery drain boards is eliminated.

A further feature of my invention resides in providing a work board having hook or shoulder means so that the board may be removed when so desired. The work board may have double hook or shoulder means so that either side of the board may be used. One side of the board has a rubber mat and the other side has a wood face. This type of board is used where a sink has only one drain board. Thus the bread board or the rubber drain board may be used as desired.

It is another feature of my invention to provide a flexible bread or work board which can be pulled out across the face of a sink from a roller supporting means located behind the sink wall. In this case, the bread board may be concealed when not in use, yet is conveniently located and readily accessible.

These and other objects and novel features of my invention will be more clearly and fully set forth in the following specification and claims.

In the drawings forming a part of my specification:

Figure 1:
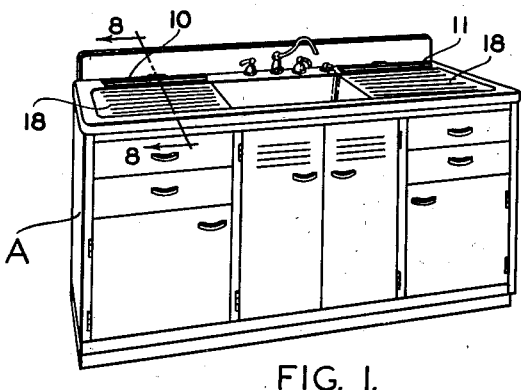
Figure 1 is a perspective view of a sink having a bread or work board and drain board.
Figure 5:
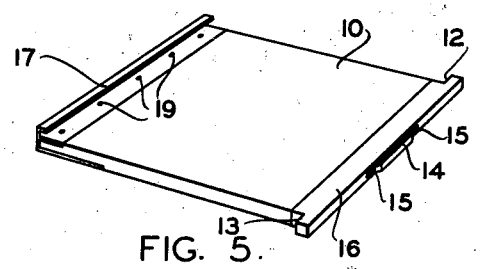
Figure 5 is a perspective view of a bread board having a single marginal hook transverse of one end thereof.
Figures 6, 8:
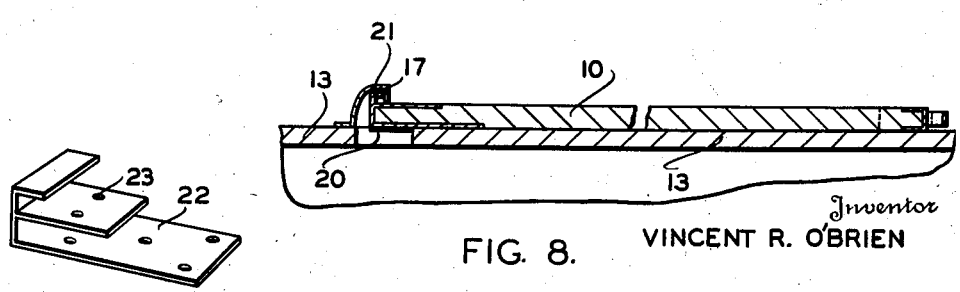
Figure 6 is a perspective view of one of the small hooks used for pivoting the bread board.
Figure 8 is a sectional view taken through the face of a sink, showing the bread board and pivot means thereof, such as on the line 8—8 of Figure 1.
Figure 9:
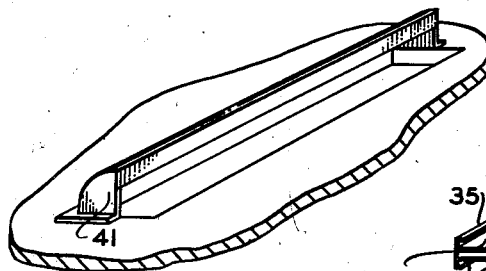
Figure 9 is a perspective view of the hood which holds the hooks in place.

My bread or work board 10 illustrated in Figure 1 of the drawings, is shown in combination with a sink A. My drain board 11 is also shown in its location with respect to the drain board of the sink A. The bread board 10, which is best illustrated in Figure 5 of the drawings, is provided with shoulders 12 and 13 which overlap the face 18 of the sink A. A handle 14 is held by means such as screws 15, to the bread board 10. A chromium covering 16 is provided over the end of the board 10 and covering shoulders 12 and 13. This chromium adds attractiveness and luxury to the bread board. At the other end of the bread board a long hook 17 is provided which is secured to the board 10 by means such as screws 19. When the bread or work board 10 is brought up from the slot 20 in the surface of the sink 18, the hook 17 is held by a housing means 21. The housing means 21 acts as a means of holding the hook 17 in place. The hook as illustrated in Figure 8 and described heretofore, is fastened to the board 10 and thus by means of the housing 21 the board 10 is held in place on the face 18 of the sink A.

Figure 4:
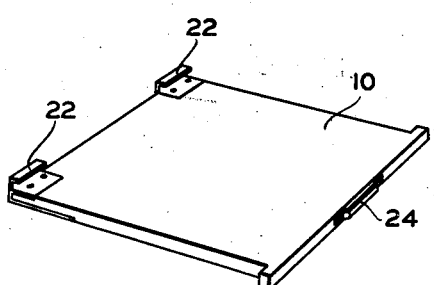
Figure 4 is a perspective view of a bread board having two hooks.

In Figure 4 of the drawings I have illustrated an alternative form of clamping means. I have provided two hooks 22. The hooks 22 are best illustrated in Figure 6. These hooks 22 are provided with holes 23 through which screws are placed to hold the hook 22 to the board 10. In the case where separate hooks are used, the housing which holds the hooks does not have to extend the entire length of the board, but only has to be made in separate units covering the separate hooks. A handle 24 is provided on the board 10 illustrated in Figure 4, which is made without the chromium covering as is illustrated in Figure 5 of the drawings.

Figure 7:
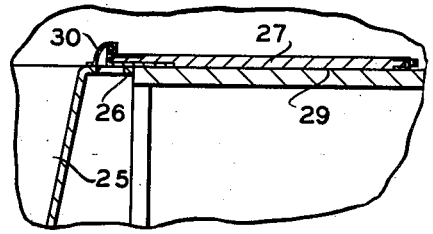
Figure 7 is a sectional view taken through a sink basin like in Figure 3, and showing the cabinet constructed adjacent the sink.
Figure 3:
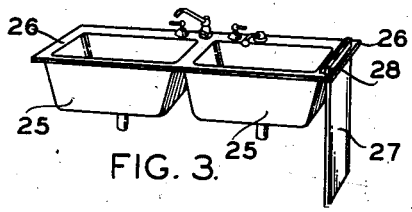
Figure 3 is a perspective view of a double sink basin where the bread board may be a part of the accessories of the sink.

In Figure 3 I show a sink arrangement having basins 25 and side edges 26. The bread board 27 is held in place to the sink edge 26 by means of a shoulder 28. After the sink basins 25 are built inside of a cabinet arrangement, the board can be used to rest on top of the face of the built-in cupboard. This form is best illustrated in Figure 7 of the drawings. The bread board 27 is shown lying on the face 29 of the cupboard. The housing 30 is fastened by means to the edge 26 of the basin 25. In this construction, the bread board 27 is constructed so as to be an accessory to the sink arrangement which is used for built-in cupboards.

Figure 10:
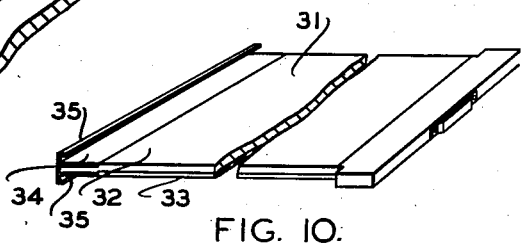
Figure 10 is a perspective view of a bread board having a bread board face and a rubber drain board face.

A modified form 31 of my bread board, shown in Figure 10, is made with a bread board face 32 and a drain board face 33. The drain board face 33 is made of rubber or like material. In the case of the bread board which has a wooden face and a rubber drain board face, a hook 34 is fastened to the bread board 31 which has a double hook means 35.

Figure 2:
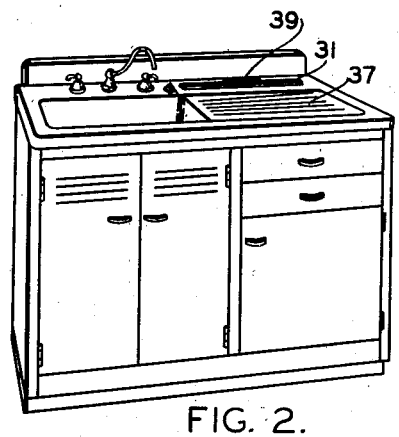
Figure 2 is a perspective view of the sink having a bread board and drain board in one.
Figure 11:
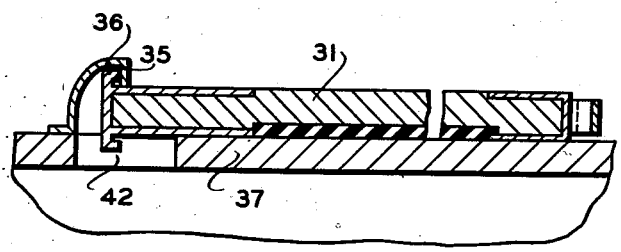
Figure 11 is a sectional view through a sink face or shelf and work board like that illustrated in Figure 10.
Figure 12:
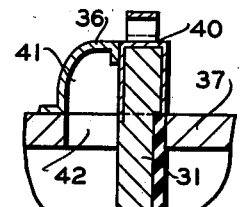
Figure 12 is a sectional view taken through the top end of a bread board, showing the handle and the hook which is fastened to the sink face.

The manner in which the bread board is pivoted and laid on the face of the sink is best illustrated in Figure 11 of the drawings. In Figure 11, I show the hook means 35 secured by a housing 36. The bread board 31 is thus held in place in relation to the sink face 37. The hook means 35 is so constructed that the bread board 31 may be picked up and the hook means 35 can become free of the housing 36, thus freeing the bread board 31 from the sink face 37. In this case, when it is so desired, the board may be taken off of the sink and turned around, thus making it possible to use the rubber drain board. This kind of a double board which has the wooden face for the bread board and the rubber face for the drain board, is used in cases where a sink has only one drain board face, such as is illustrated in Figure 2 of the drawings. In this figure, the bread board 31 is shown in the sink with enough of the bread board extending above the face of the sink 37 so that the handle 39 which is secured to the board 31 may be easily grasped in the hand and picked up and laid on the face of the sink. When the bread board 31 is down in the slot 42 below the face of the sink 37, the top of the bread board 40 is flush with the housing 36. The housing 36 has closed-in ends 41. Thus when the bread board is in the closed position, it is very compact and all of the openings are closed. In cases where the end of the bread board has a chromium covering it is very attractive.

Figure 14:
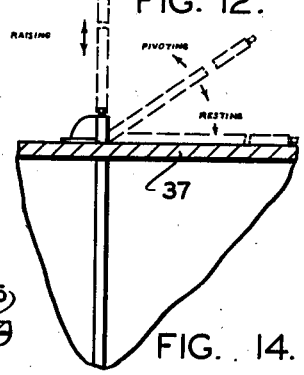
Figure 14 is a sectional view showing the bread board in dotted lines in various positions, such as in raising, pivoting, and resting in working position.
Figure 17:
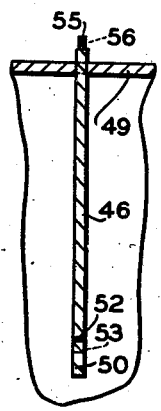
Figure 17 is a sectional view indicated by the line 17—17 of Figure 15.
Figure 16:
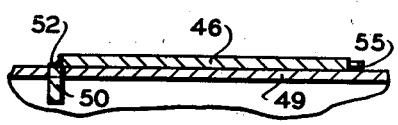
Figure 16 is a sectional view showing the bread board of Figure 15 resting on the face of a sink in working position.

In Figure 14 of the drawings, I show the bread board in its various positions. The board can be picked up through the slot 42 of the face 37 of the sink and laid down to rest on the face 37 of the sink A.

Figure 13:
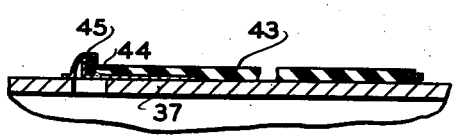
Figure 13 is a sectional view taken through a rubber drain board, showing the pivot hook means and the hood for engaging the hook means.

In Figure 13 I show another form of drain board which is made of solid rubber. The solid rubber drain board 43 has hook means 44 and 45 similar to those of the previously described bread boards.

Figure 15:
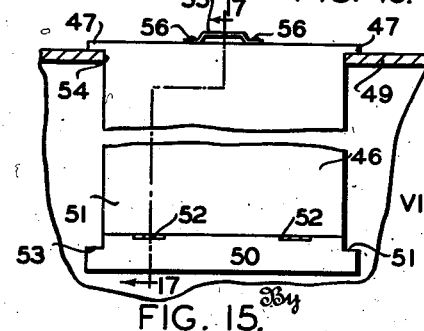
Figure 15 is a sectional view of a modified form of my bread board, having shoulders and pivot means thereof.

In Figure 15, I disclose another form of my bread or work board 46. This board 46 is provided with shoulders 47 which rest on the sink face 49, thus holding the board in a proper position. The board 46 is formed with a bottom piece 50 which is secured to the upper portion of the board 51 by means of hinges 52. The lower portion of the board 50 also has shoulders 53 similar to the shoulders 47. When the board 46 is pulled up through the slot 54 the shoulders 53 come in contact with the sink face 49 and stop the bread board from being pulled out of the slot 54. In this arrangement, the bread board 46 cannot be rejected from the face of the sink 49. A handle 55 is secured by nut means 56 to the board 46 in order that the board may be picked up and laid down on the face 49 of the sink.

I claim:

1. In combination with the horizontal top portions of a sink, an elongated slot formed in said top along the back thereof, a board adapted to extend through the slot, means to hold the board suspended vertically from margins of the slot, said means permitting the board to be brought out of the slot and swung to a horizontal position to be supported by said top portions, and cooperating means on the board and secured to said top part to prevent the board from being displaced away from the slot.

2. In combination with the horizontal top portions of a sink, an elongated slot formed in said top along the back thereof, a board adapted to extend through the slot, the slot being substantially wider than the thickness of the board, a housing on said part overlying a portion of the slot, means to hold the board suspended vertically from margins of the slot, said means permitting the board to be brought out of the slot outside of the housing and swung to a horizontal position to be supported by said top portions, a hook on the board and cooperating hook means on the housing to normally prevent the board being displaced away from the slot.

3. In combination with the horizontal top portions of a sink, an elongated slot formed in said top along the back thereof, a board adapted to extend through the slot, the slot being substantially wider than the thickness of the board, a housing on said part overlying a portion of the slot, means to hold the board suspended vertically from margins of the slot, said means permitting the board to be brought out of the slot outside of the housing and swung to a horizontal position to be supported by said top portions, a hook on the board and cooperating hook means on the housing to normally prevent the board being displaced away from the slot, said cooperating hook means being of a size and position relative to the width of the slot to permit the board when in an angular position relative to said top parts to be withdrawn from the slot.

VINCENT R. O'BRIEN.